United States Patent [19]

Johnson

[11] 4,288,153
[45] Sep. 8, 1981

[54] AUTOMATIC STROBE CAMERA
[75] Inventor: Bruce K. Johnson, Andover, Mass.
[73] Assignee: Polaroid Corporation, Cambridge, Mass.
[21] Appl. No.: 80,130
[22] Filed: Sep. 28, 1979
[51] Int. Cl.[3] .................. G03B 7/087; G03B 7/16; G03B 15/05
[52] U.S. Cl. .................. 354/27; 354/33; 354/34; 354/60 F; 354/139
[58] Field of Search .......... 354/25, 27, 33, 34, 354/60 F, 137, 139, 195, 196, 198, 145, 149

[56] References Cited

U.S. PATENT DOCUMENTS

| | | | |
|---|---|---|---|
| 3,438,766 | 4/1969 | Biber | 354/35 |
| 3,543,662 | 12/1970 | Erlichman | 206/62 X |
| 3,683,769 | 8/1972 | Uchiyama et al. | 354/33 |
| 3,705,542 | 12/1972 | Gold | 354/180 |
| 3,748,984 | 7/1973 | Gold | 354/77 |
| 3,779,770 | 12/1973 | Alston et al. | 354/174 |
| 4,007,469 | 2/1977 | Land et al. | 354/27 |
| 4,023,187 | 5/1977 | Shenk | 354/27 |
| 4,035,813 | 7/1977 | Whiteside | 354/27 |
| 4,074,288 | 2/1978 | Johnson et al. | 354/33 |
| 4,079,389 | 3/1978 | Hashimoto et al. | 354/33 |
| 4,085,414 | 4/1978 | Burgarella et al. | 354/145 |
| 4,086,606 | 4/1978 | Finelli et al. | 354/288 |
| 4,162,836 | 7/1979 | Harrison | 354/195 X |
| 4,188,103 | 2/1980 | Biber et al. | 354/139 X |
| 4,192,587 | 3/1980 | La Rocque et al. | 354/34 X |

OTHER PUBLICATIONS

Practical Photography, Oct., 1978, pp. 58–59, "Flash Fill-in".

Primary Examiner—Michael L. Gellner
Attorney, Agent, or Firm—David R. Thornton

[57] ABSTRACT

A photographic camera employing a replaceable film pack, which includes a battery, utilizes an integral strobe unit powered from the pack battery and automatically provides strobe operation for all ambient scene light conditions. The camera provides automatic charging of the strobe unit from the pack battery and triggering of the strobe at an aperture value selected in accordance with subject distance during scene exposure under all levels of ambient scene light to automatically provide a flash exposure under low ambient light and a flash fill-in exposure under high ambient light conditions.

6 Claims, 3 Drawing Figures

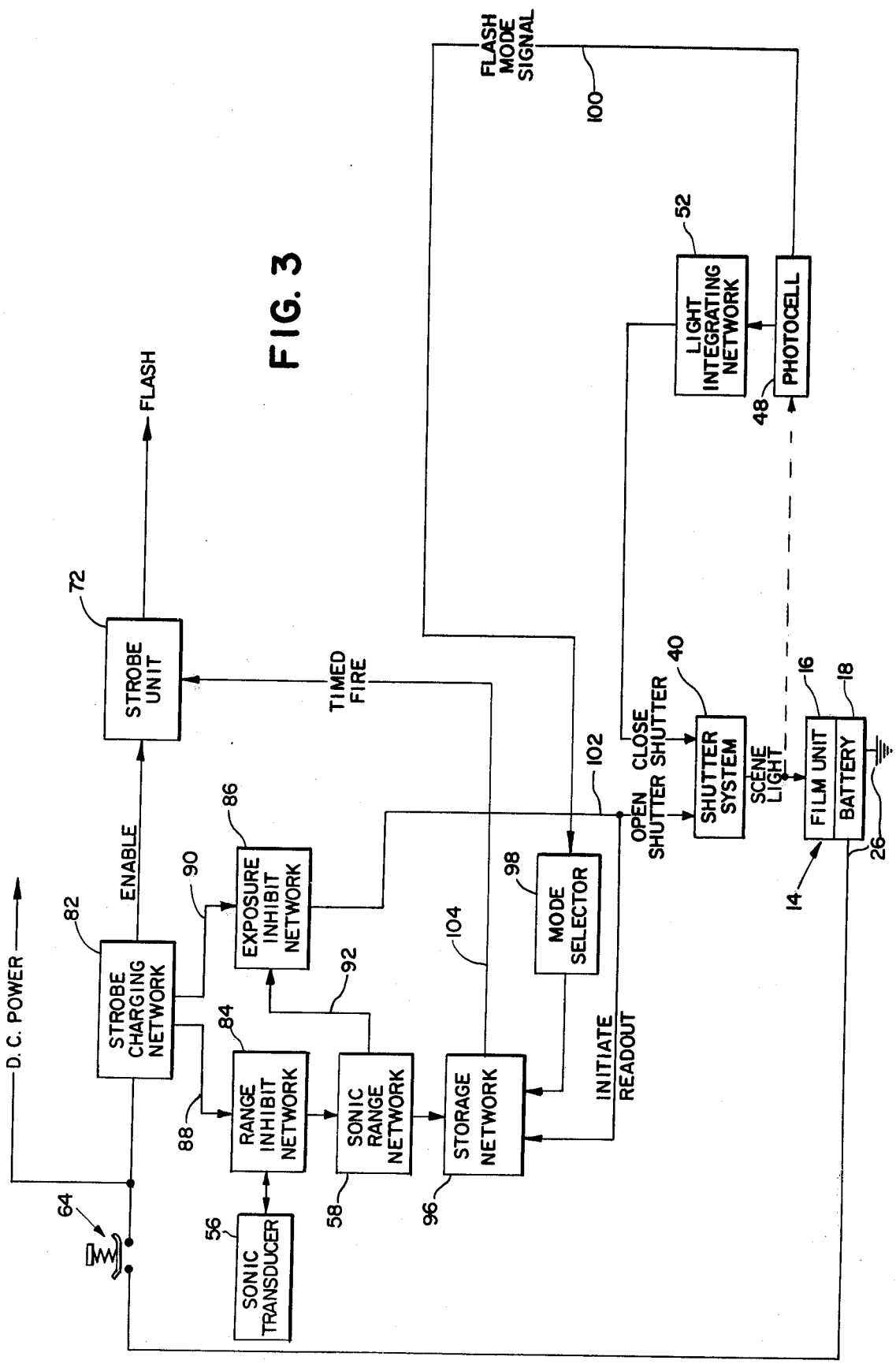

AUTOMATIC STROBE CAMERA

BACKGROUND OF THE INVENTION

1. Field of the Invention

This invention relates to photographic cameras and, more particularly, to photographic cameras providing electronic flash illumination.

2. Description of the Prior Art

The use of transient artificial illumination such as from incandescent flash bulbs or electronic strobe units for providing scene illumination for photographic exposures under conditions of low ambient scene light intensity, are well known in the art. Examples of camera systems which utilize strobe illumination under low ambient conditions are described in U.S. Pat. No. 4,007,469 granted on Feb. 8, 1977 to Edwin H. Land, et al; U.S. Pat. No. 4,086,606 granted to Patrick L. Finelli, et al. on Apr. 25, 1978; U.S. Pat. No. 4,085,414 granted on Apr. 18, 1978 to John P. Burgarella, et al; and U.S. Pat. No. 3,438,766 granted on Apr. 15, 1969 to Conrad H. Biber.

Additionally, the use of transient illumination during an exposure under higher ambient scene illumination for fill-in flash are also well-known in the art. In the latter case, the transient illumination is generally employed, not as the primary illumination for exposure, but rather as supplementary to the ambient illumination so as to add foreground illumination of the subject, soften shadows, or to generally increase the subject illumination.

In many fill-in arrangements, the camera operator manually selects the use of fill-in flash and the proper exposure parameters which determine the relative effectiveness of the transient illumination and the ambient illumination. Examples of such fill-in flash systems are described in "Flash Fill-in", page 58, Practical Photography, October, 1978; U.S. Pat. No. 4,079,389 issued Mar. 14, 1978 and in U.S. Pat. No. 4,023,187 issued May 10, 1977.

The latter patents both describe camera systems which will operate in a fill-in flash mode when a flash accessory is mounted on the camera. The camera described in U.S. Pat. No. 4,079,389 requires manual selection of the degree of flash exposure, while U.S. Pat. No. 4,023,187 automatically determines the latter. Consequently, at least in the latter case, mere mounting of the flash unit on the camera under normal scene light conditions provides selection of the fill-in flash mode. However, the operator must still make a deliberate selection of this mode and often, either forgets to make use of this fill-in flash arrangement, or deliberately avoids use of the latter; perhaps for reasons of economy and a lack of understanding or appreciation of the value of fill-in flash. Hence, while the prior art suggests using transient illumination under varying conditions of scene illumination, the determination of whether to use transient illumination in addition to the normal scene illumination is generally left to the decision of the operator. Consequently, it is an object of this invention to provide a photographic camera automatically employing improved exposure control under substantially all conditions of ambient scene illumination.

A further object is to provide a fully automatic strobe camera which will automatically provide strobe illumination under all scene lighting conditions at least when the subject is within range of the strobe illumination. Another object of this invention is to provide a fully automatic strobe camera utilizing a film cassette and battery combination configured to automatically fire a strobe flash during all or substantially all camera exposure operations.

SUMMARY OF THE INVENTION

Briefly, the above and other objects of the invention are obtained by camera apparatus providing increasing aperture values and with a pulse of transient illumination produced at an aperture value selected in accordance with subject distance at all ambient scene light levels, at least for subjects located within a given maximum subject distance at which the flash illumination will have effect. The camera is provided with a built-in electronic flash unit coupled to the camera actuator and energized by the film pack battery such that the flash device is illuminated for each film exposure.

In accordance with the invention, the camera includes means for receiving a film pack containing a battery, a scanning shutter system, and means for determining subject distance and providing a range signal corresponding thereto. Also included is an integral electronic flash chargeable by the film pack battery for producing a pulse of illumination, photometric means for evaluating the scene light level, and a control circuit, responsive to the operation of a manual actuator, for opening the scanning shutter system to initiate film exposure, for then triggering the flash unit to produce a pulse of light at an effective aperture value determined in accordance with the range signal, and in response to the photometric means for subsequently closing the shutter to terminate the exposure after an appropriate exposure interval.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the illustrated embodiment when read in connection with the accompanying drawings wherein like numbers have been employed in the different figures to denote the same parts and wherein:

FIG. 3 is a block diagram depicting many of the electrical functions of the camera shown in FIGS. 1 and 2.

DETAILED DESCRIPTION OF THE INVENTION

Figure 1:
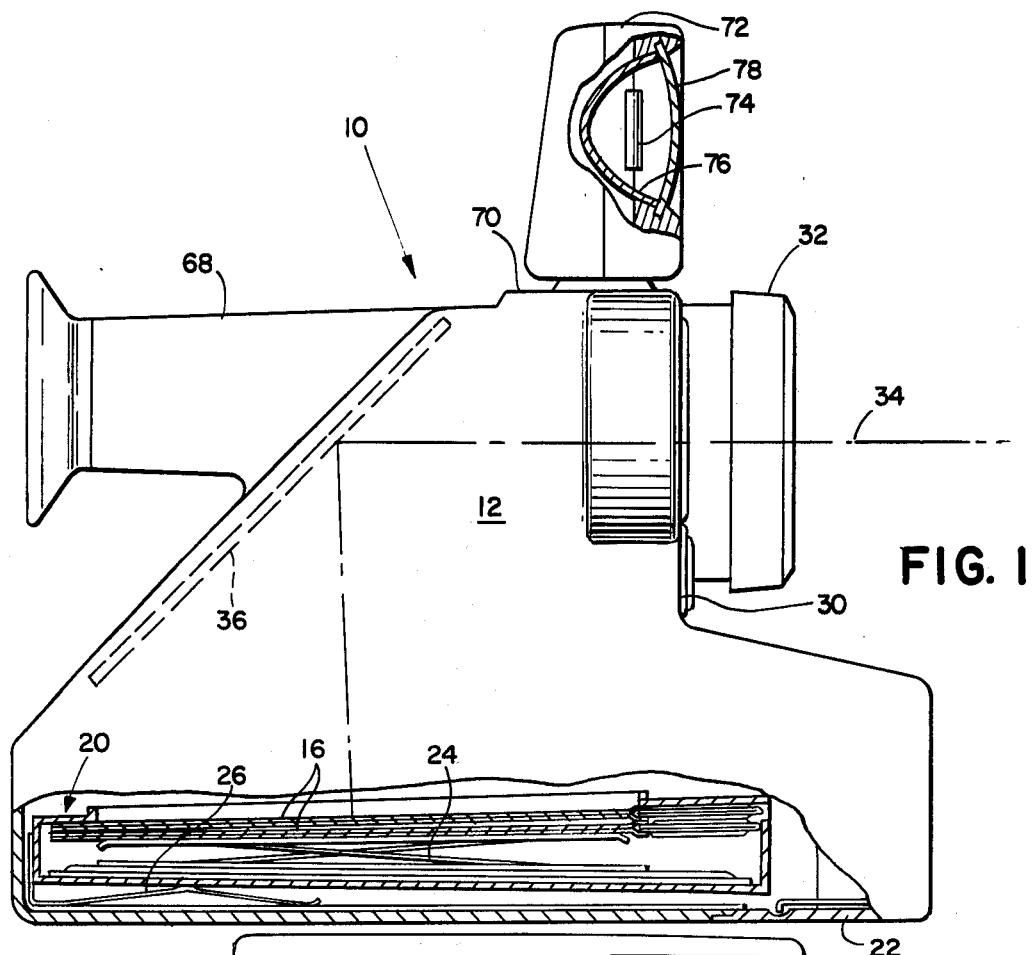
FIG. 1 is a diagrammatic side elevational view of a photographic camera in accordance with the present invention with portions cut away to reveal interior elements thereof.
Figure 2:
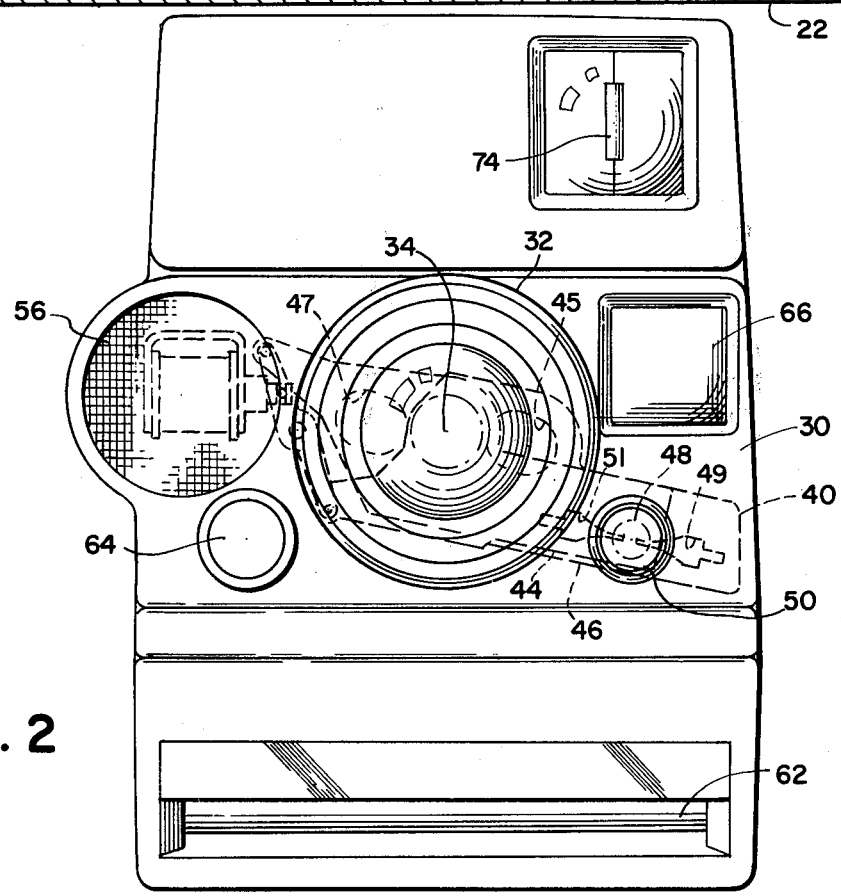
FIG. 2 is a front elevational view of the camera shown in FIG. 1 with some interior portions shown in dotted outline.

In FIGS. 1 and 2, there is shown a camera 10 comprising a housing 12 configured to receive a film pack 14 which includes a plurality of film units 16 mounted over a flat battery 18 as, for example, is described in U.S. Pat. Nos. 3,543,662; 3,705,542; 3,748,984 and 3,779,770. In this regard, the camera 10 is a self-developing camera designed for use with a film pack of the type manufactured and sold by the Polaroid Corporation as the Polaroid SX-70 Land film pack.

Within the camera housing 12 is a receiving chamber 20, access to which is provided by a door member 22. The chamber 20 is designed to receive the film pack 16 in a fixed location with a spring member 24, carried within the film pack 14 as noted in the aforementioned U.S. Pat. No. 3,543,662, urging the film units 16 forwardly such that the uppermost unit thereof is positioned at the focal plane of the camera. Included within the receiving chamber 20 are a pair of battery contacts 26 which extend within the film pack 14 to provide connection between the camera 10 and the battery 18.

Mounted on a front wall 30 of the housing 12 is an adjustable lens assembly 32 which is configured for focusing image carrying rays from the photographic scene along an exposure path 34 to a mirror 36 from which they are reflected to the uppermost film unit 16. Control of the exposure path is provided by a scanning shutter system 40, under the control of an electrical solenoid 42 as is explained in detail in U.S. Pat. No. 3,942,183. In this arrangement, the scanning shutter system employs a pair of blades 44 and 46 which, upon release by the solenoid 42, are spring biased to bring a pair of primary or taking apertures 45 and 47, respectively, provided within the blades, into increasing coincidence at the taking path 34 so as to provide increasing aperture values thereat during initiation of the exposure interval. Hence, the scanning shutter system 40 in effect is a diaphragm-shutter which provides electrically actuatable means for unblocking and blocking the exposure path to define an exposure interval and for defining varying aperture values in operative relation to the exposure path during that interval.

A photoresponsive device or photocell 48 is carried within the camera 10, behind the shutter 40, and exposed to scene light through a lens arrangement 50 also mounted on the front face 30 of the camera. Scene light transmitted to the photocell is controlled in conjunction with film exposure, as noted in the aforementioned U.S. Pat. No. 3,942,183, by means of a pair of secondary apertures 49 and 51 also carried by the shutter blades 44 and 46; the secondary apertures operate in a tracking relation to the taking apertures of the blades.

As previously indicated, the camera 10 is of a self-developing type in which the film is processed to a viewable condition. Hence, following the exposure of the uppermost film unit, the latter is transported from the camera by way of a processing station (not shown) located between the film pack receiving chamber 20 and the film exit slot 62.

A camera actuator switch or button 64 is also mounted on the front face 30 in a convenient location to facilitate camera actuation by the operator. Additionally, a viewing window 66 is located in the front face 30 and operates in conjunction with a viewing system 68 to permit viewing and framing of the scene by the operator.

Permanently affixed to an upper surface 70 of the housing 10 is an electronic strobe unit 72, which includes a flash discharge tube 74 located in a suitable reflector 76 behind a lens 78; the latter serving to focus light from the flash tube 74 into the zone of view of the camera 10. The electronic flash unit 72 is provided as an integral part of the camera 10 in accordance with the invention and is powered from the battery which is carried in the film pack. In this regard, the electronic strobe may be of the type described in U.S. Pat. No. 4,074,295 entitled "Compact Accessory Strobe for Cameras with Battery Enclosed Film Pack" issued to R. Kee on Feb. 14, 1978. Unlike the aforementioned electronic flash unit, however, the flash unit of the present invention is an integral part of the camera and is intended for use in all exposures or at least where the strobe light is effective, as will be subsequently explained with regards to FIG. 3.

Flash firing is controlled by a transducer 56, mounted on the front face 30 of the camera 10, which operates as later explained in conjunction with a sonar range network 58, of the type described in copending patent application Ser. No. 840,802 entitled "Ultrasonic Ranging System For A Camera" filed Nov. 11, 1977, and commonly assigned herewith. The range network 58 includes appropriate circuitry (not shown) which, by means of the transducer 56 emits an ultrasonic burst directed towards a central portion of the photographic scene so as to be reflected from subjects positioned therein and which, upon receipt of an echo from such subjects, by virtue of the elapsed time from emission to echo, provides an appropriate signal corresponding to this time interval and, hence, to the distance of the subject from the camera 10. This subject distance signal is utilized in the illustrated embodiment primarily for controlling the firing time of the electronic flash unit 72 to ensure the selection of a proper aperture value as will be more fully explained below. Additionally, although not necessary to the present invention, the sonic signal is also preferably utilized for focusing of the lens assembly 32, and in the latter case, an electrically energizable lens driving arrangement (not shown) would be provided for lens focusing.

Turning now to FIG. 3, wherein the operational arrangement of the camera 10 is shown in block diagram form, it should be first noted that the film pack 14 or, more particularly, the battery 18 thereof, is employed as the sole source of energy for the complete camera which includes the strobe unit 72. In this arrangement, operation of the actuator button 64 by the camera operator powers up the camera and through a logic sequence as later explained, triggers each of the operation units into operation at an appropriate point in the camera cycle. A conventional latching arrangement (not shown) is employed in conjunction with the camera button 64 to maintain camera operation throughout the complete cycle; the latch being activated with initial button operation and released upon the operation of the final event in the cycle.

In the illustrated circuit, actuation of the button 64 initiates energization of a strobe charging network 82 which, when fully charged, enables the strobe unit 72 for subsequent firing. During charging of the charging network 82, operation of other components is inhibited by appropriate logic circuitry, designated by a range inhibit circuit 84 and an exposure inhibit network 86. The latter networks may be provided by any suitable means, such as a flip flop circuitry or conventional logic arrangements wherein network 84 clamps or holds the sonic range network 58 inoperative until strobe charging is complete and network 86 holds the shutter system inoperative until both strobe charging and subject ranging is complete.

Consequently, in this arrangement during strobe charging the inhibit networks 84 and 86 are active due to a "charging" signal on lines 88 and 90. When charging ceases, the range inhibit network 84 is released, which in turn triggers the sonic range network 58 into operation. Activation of the exposure inhibit network continues, however, due to a "ranging" signal presented on line 92.

Upon activation, the sonic range network 58 initially operates in a transmit mode to pulse the transducer 56 which transmits a sonic burst toward the subject to be photographed and then in a receive mode listens for the sonic echo therefrom. The elapsed time, being proportional to subject distance, is stored as a timed range signal in a storage network 96, for example, a digital clock and counter system which is activated in synchronism with the sonic transmission and stopped upon the echo return, such that the stored count provides an appropriate range signal.

Prior to completing the operational description of the camera, the utilization of the range information will be described. As indicated, the range signal is principally employed herein for dynamic selection of a flash aperture in a manner at least similar to that described in the commonly assigned, copending application Ser. No. 898,546 entitled "Range Synchronized Flash Photographic Apparatus and Method for Achieving Optimum Flash Exposure" filed Apr. 21, 1978. Hence, the aperture scanning shutter system produces changing aperture values during the exposure and the strobe is fired at a time value coordinated with subject range and the scanning rate of the shutter so that the pulse of strobe light is synchronized in time with an aperture or, more precisely, a very narrow range of aperture values selected in dependence upon subject distance.

That is, as the shutter opens, increasingly enlarging aperture values are provided until adequate scene light has been received by the photocell 48 to charge a summing capacitor included within the light integrating network 52 to an appropriate level determined in accordance with the exposure parameters of the film unit 16. During this scanning operation of the shutter, various aperture values are defined, each in accordance with an elapsed time interval as measured from either first light or the opening actuation of the shutter. Consequently, the strobe unit is timed to be fired when an appropriate aperture selected in accordance with the subject distance is provided by the shutter system 40. This may be accomplished by design of the shutter system to provide aperture values varying at a rate comparable to the distance time relationship of the sonic range network, or by converting the sonically derived ranging time in proportion to the design curve of the opening rate of the shutter. In either case, the shutter system 40 and the storage network 96 are coordinated so that the strobe unit 72 will be fired at a time at which an appropriate aperture selected in accordance with subject distance is in operative relation over the exposure path 34 in the camera 10.

Since the ratio of sonic range time versus subject distance is known as well as the aperture scanning rate, the clock or count rate of the storage network can be provided such that the timed output thereof for any given subject distance will be equal to the time it takes for the shutter, as measured from first light, to reach an aperture value selected in accordance with subject distance. For low ambient scene light, the selected aperture value is directly related to subject distance in a conventional manner such that with a constant flash output, proper exposure of the film is assured independently of subject range up to a maximum subject range which is determined by the maximum aperture of the camera and the strobe output.

For fill-in flash, where the ambient scene light is no longer negligible, the strobe contribution to the exposure is reduced by selecting a smaller flash aperture than that previously described. This is accomplished in the illustrated circuit by a mode selector 98 which alters or switches the storage network 96 to provide a flash time signal appropriate to a fill-in flash mode. For example, when the ambient scene light is above a selected threshold value, the mode selector 98 may be appropriately triggered to shift the counting of the storage network to a slower rate, thereby providing a shorter time value for a given subject distance. This, in turn, provides an earlier flash fire, and hence, a smaller aperture value which, in turn, results in less strobe contribution for a given subject distance.

As described, the mode selection requires pre-exposure evaluation of scene light, for example, by an additional photocell or provision for presentation of the photocell 48 to scene light prior to shutter opening, in which case a flash mode signal may be made available from the photocell 48 by way of line 100 prior to exposure actuation. Alternately, the mode selection may be provided simultaneously with initiation of exposure by altering the readout rather than the read in of the range storage network as previously described. That is, the range signal may always be stored as a timed count suitable for fill-in flash fire time and then, upon readout, appropriately altered by a given ratio or fixed delay to provide flash fire for the flash mode.

Returning once again to the overall operation, when the sonic range network receives the subject echo, indicating completion of ranging, the ranging signal presented to the exposure inhibit network 86 over line 92 is terminated, such that this inhibit network is released and the shutter 40 is, in turn, triggered via line 102 to open. This, in turn, emits scene light to the uppermost film unit of the film pack 16 and to the photocell 48; with current from the latter being summed in the light integrating network 52 in a conventional manner.

Simultaneous with opening of the shutter system 40, the storage network 96 is triggered to initiate its readout or, that is, start the count down for flash fire. For example, the storage network 96 may include an up and down counter which reads up on range storage and is then read down, with the strobe fire signal being provided via line 104 to the strobe unit 72, when the count readout is complete. As indicated, the burst of light from the strobe unit 72 by virtue of the tailored flash time will occur when an aperture value selected in accordance with subject range is provided by the shutter.

Subsequently, when the integrating network reaches a predetermined summing value, a close command signal is delivered to the shutter system 40 which closes the shutter to thereby terminate the exposure. While not depicted in FIG. 3, following the closing of the shutter, the exposed film unit is advanced from its exposure position through a processing station (not shown) and from the camera.

While not necessary to the operation of the illustrated embodiment, since the strobe will be ineffective at large subject distances, a switching arrangement (not shown) can be provided to eliminate strobe flash for such exposures. Hence, it should be understood that the circuit of FIG. 3 provides control means programmed to be responsive to every operation of the actuator 64, at least when photographing a subject within the maximum effective range, for actuating the shutter, or unblocking and blocking means, for determining the ambient light level, for firing the strobe 72 at an appropriate aperture as selected by the range system, and for then terminating the exposure in accordance with the ambient scene light level.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A camera for use under conditions ranging from insignificant ambient scene light intensity to substantial scene light intensity, said camera comprising:
    a housing having means for defining a focal plane;
    a lens assembly for directing image forming light rays from a photographic scene along a given exposure path to said focal plane;
    means for positioning a sheet of photographic film at said focal plane;
    energizable means for evaluating scene light;
    an electrically controlled shutter arrangement actuatable for unblocking and blocking said exposure path to define an exposure interval, said shutter arrangement including means responsive to each actuation of said shutter arrangement for defining the same pattern of varying aperture values, including progressively enlarging aperture values, in operative relation to said exposure path in the absence of actuation of said shutter to terminate said exposure interval prior to said shutter arrangement defining its maximum achievable aperture value;
    an electronic flash unit permanently affixed on said housing and having a predetermined maximum effective range;
    means for producing a range signal corresponding to the distance of a photographic subject from said camera;
    a manual actuator; and
    circuit control means programmed to be responsive to every operation of said manual actuator, at least when photographing a subject within the maximum effective range of said flash unit, for effecting the actuation of said shutter arrangement to initiate an exposure interval, for automatically firing said electronic flash unit during each said exposure interval at the instant an aperture value, correlated to said range signal and selected from said enlarging aperture values, is presented in operative relation to said exposure path by said shutter arrangement, and for then actuating said shutter arrangement to terminate said exposure interval in accordance with a predetermined film exposure being achieved,
    whereby, whenever a photographic subject is within said maximum effective range of said flash unit during different exposure operations, said camera is preprogrammed to automatically provide photographic exposures embodying range dependent, aperture controlled amounts of flash illumination responsive to all normally intended actuations of said manual actuator regardless of the levels of ambient scene light present.

2. The camera of claim 1 wherein said range signal producing means additionally includes actuatable ranging means for automatically determining subject distance and in response thereto for producing said range signal, and said control means includes means responsive to operation of said manual actuator for automatically actuating said ranging means.

3. The camera of claim 1 or 2 wherein said film positioning means includes means for receiving a film pack including the sheet of film, the film pack additionally including a battery, and wherein said control means includes means for coupling said scene light evaluating means, said shutter arrangement and said flash unit to said battery upon each actuation of said manual actuator.

4. The camera of claim 1 or 2 wherein the firing of said flash is at an aperture value correlated to both said range signal and the ambient scene light level.

5. A camera for use under conditions ranging from insignificant ambient scene light intensity to substantial scene light intensity, said camera comprising:
    a housing having means for defining a focal plane;
    a lens assembly for directing image forming light rays from a photographic scene along a given exposure path to said focal plane;
    means for positioning a sheet of photographic film at said focal plane;
    energizable means for evaluating scene light;
    an electrically controlled shutter arrangement actuatable for unblocking and blocking said exposure path to define an exposure interval, said shutter arrangement including means responsive to each actuation of said shutter arrangement for defining the same pattern of varying aperture values, including progressively enlarging aperture values, in operative relation to said exposure path in the absence of actuation of said shutter to terminate said exposure interval prior to said shutter arrangement defining its maximum achievable aperture value;
    an electronic flash unit permanently affixed on said housing and having a predetermined maximum effective range;
    a manual actuator; and
    circuit control means programmed to be responsive to every operation of said manual actuator, at least when photographing a subject within the maximum effective range of said flash unit, for effecting the actuation of said shutter arrangement to initiate an exposure interval, for automatically firing said electronic flash unit during each said exposure interval to expose said sheet of film with a controlled amount of flash illumination reflected from a photographic subject depending upon the distance of said subject and the ambient scene light intensity, and for then actuating said shutter arrangement to terminate said exposure interval in accordance with a predetermined film exposure being achieved,
    whereby, whenever a photographic subject is within said maximum effective range of said flash unit during different exposure operations, said camera is preprogrammed to automatically provide photographic exposures embodying range dependent controlled amounts of flash exposure responsive to all normally intended actuations of said manual actuator in accordance with the levels of ambient scene light present.

6. The camera of claim 5 wherein said film positioning means includes means for receiving a film pack including the sheet of film, the film pack additionally including a battery, and wherein said control means includes means for coupling said scene light evaluating means, said shutter arrangement and said flash unit to said battery upon each actuation of said manual actuator.

* * * * *